United States Patent
Baker et al.

[15] 3,679,233
[45] July 25, 1972

[54] VERTICALLY ADJUSTABLE TRAILER HITCH

[72] Inventors: Calvin Lee Baker, 3242 Winton Road S.; Clarence H. Rogers, 3230 Winton Road S., both of Rochester, N.Y. 14623

[22] Filed: March 10, 1971

[21] Appl. No.: 122,682

[52] U.S. Cl..........................280/476 R, 280/5 E, 280/490 R
[51] Int. Cl..........................................B60d 1/00, B60p 3/22
[58] Field of Search..................................280/476, 490, 5 E

[56] References Cited

UNITED STATES PATENTS

| 2,806,710 | 9/1957 | Mascaro..........................280/490 R X |
| 3,612,555 | 10/1971 | Baker......................................280/5 E |

FOREIGN PATENTS OR APPLICATIONS

| 191,380 | 8/1937 | Switzerland........................280/490 R |
| 214,316 | 7/1941 | Switzerland........................280/490 R |
| 770,165 | 3/1957 | Great Britain......................280/476 R |
| 808,797 | 7/1951 | Germany............................280/490 R |

*Primary Examiner*—Leo Friaglia
*Attorney*—David H. Semmes

[57] ABSTRACT

A vertically adjustable trailer hitch of the type mounted upon a trailer tongue and attachable to a towing vehicle, particularly including a ball socket arm and a parallelogram linkage interconnecting the ball socket arm and a pivotable front wheel. The parallelogram linkage enables a level ride of the trailer tongue upon the pivotable front wheel, regardless of the vertical position of the towing vehicle or hitch itself, also the hitch may be vertically extended for manual handling of the trailer apart from the towing vehicle.

8 Claims, 6 Drawing Figures

INVENTOR
CALVIN LEE BAKER
CLARENCE H. ROGERS
BY
David H. Semmes
ATTORNEY

INVENTOR
CALVIN LEE BAKER
CLARENCE H. ROGERS
BY David H. Semmes
ATTORNEY

000
VERTICALLY ADJUSTABLE TRAILER HITCH

BACKGROUND OF THE INVENTION

Field of the Invention

Wheeled trailers, particularly vertically adjusting hitches for wheeled trailers. Numerous previous inventors have addressed the problem of providing a trailer hitch which is vertically self-levelling with respect to the attitude of the towing vehicle, so as to maintain a constant load on the towing vehicle ball socket. However, none of these inventors has addressed himself to the problem of adapting such a hitch to the independent and manual handling of the towed trailer apart from the towing vehicle.

According to the present inventions, a waste disposal of other types of cargo-carrying trailer is provided with a hitch base including a pair of vertically extending sides and a downwardly extending pivoted fore-wheel, which engages the ground. A ball socket arm is provided, so as to engage a conventional ball joint on the towing vehicle and a parallelogram linkage interconnects the ball socket arm and the vertical sides so as to maintain the trailer tongue in a level position, regardless of vertical extension of the linkage. A handle may be provided on the hitch, so as to facilitate raising of the hitch above the trailer and the towing vehicle ball joint for manual handling of the trailer.

DESCRIPTION OF THE PREFERRED EMBODIMENTS

Figure 1:
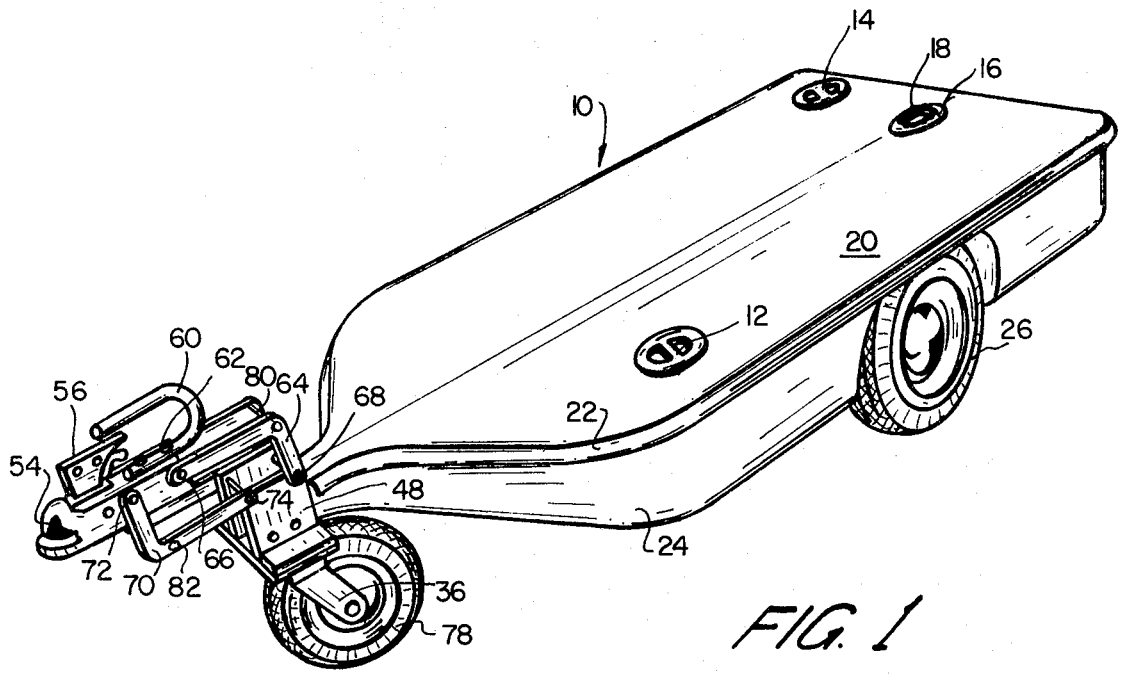
FIG. 1 is a perspective view of a trailer, embodying the present hitch in its median towing position.
Figure 4:
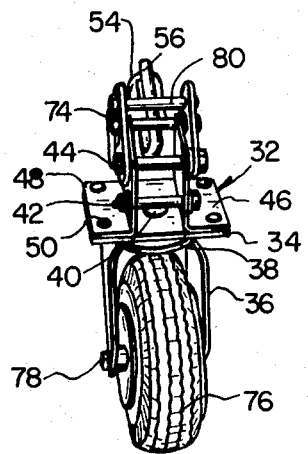
FIG. 4 is a rear elevation of the hitch in its lowest position.
Figure 5:
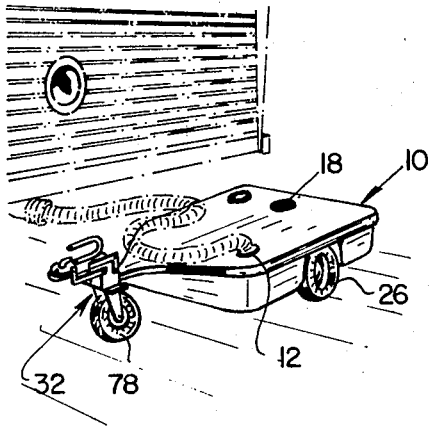
FIG. 5 is a perspective view of the hitch positioned beneath a house trailer or camper, shown in phantom, in an attitude of receiving of liquid waste from the trailer via a four-inch flexible conduit shown in phantom.
Figure 6:
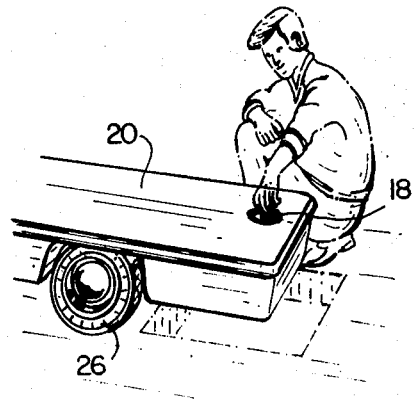
FIG. 6 is a perspective view showing dumping of the trailer vehicle liquid waste contents into a conventional sump.

In FIG. 1, a liquid waste disposal trailer, designated as 10, is shown as having liquid receiving ports 12 and 14 and a waste discharge seat 16 with vertical plunger 18 extendable to a waste discharge port beneath the trailer (not illustrated). Top 20 is generally designated as secured to sides 24 along bead 22, wherein epoxy ultrasonic or like welding techniques may be employed. The vehicle includes a pair of wheels 26 mounted upon an axle extending across the trailer bottom (not illustrated). The forward portion of the trailer converges into a tongue 30 which may be reinforced by means of Polystyrene or like expanded foam techniques. The trailer hitch 30 is particularly illustrated in FIG. 4 as comprising a horizontal base piece 34 in which downwardly depending yoke 36 may be pivoted by means of locked stud 40. A single wheel 76 may be mounted in yoke 36 upon axle 78. A pair of vertically extending side brackets 48 and 46 may be secured to the base 34 by means of identical bolts 50. Sides 46 and 48 may include transverse bolts or the like 42 and 44 which extend through the trailer tongue for securing purposes. The forward ball socket arm 52 includes a ball socket concavity 54, a lock 56 with pin 58 pivoted therein, so as to extend into the concavity 54. A U-shaped handle 60 may be secured to the top of the arm by weldments or bolts 62. A pair of top right angle arms 64 has its forward horizontal ends pivoted by means of pins 66 in the arm 52 and its rear downwardly extending ends pivoted in the brackets 48 and 46 by means of bolts 68. A pair of bottom right angle arms 70 has their forward vertically extending ends pivoted by bolts or the like in the hitch arm and its rear horizontally extending ends pivoted in the side brackets 46 and 48. Intermediate rigidizing struts 80 and 81 may be supported between the top pair and bottom pair of arms.

Figure 3:
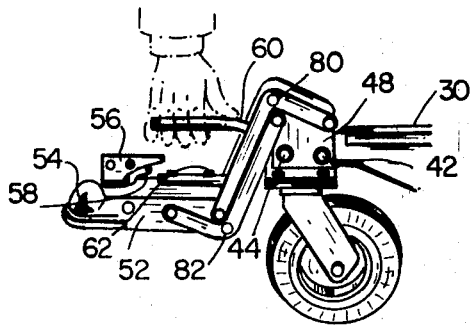
FIG. 3 is a side elevation showing the hitch in its lowest position.

In FIG. 3 the hitch is illustrated in its lowest vertical attitude prior to its being lifted by hand (illustrated in phantom) for manual handling in engaging the auto-hitch or movement independently of the auto and beneath the camper being serviced.

In FIG. 1 the hitch is illustrated in its median position in a towing attitude.

Figure 2:
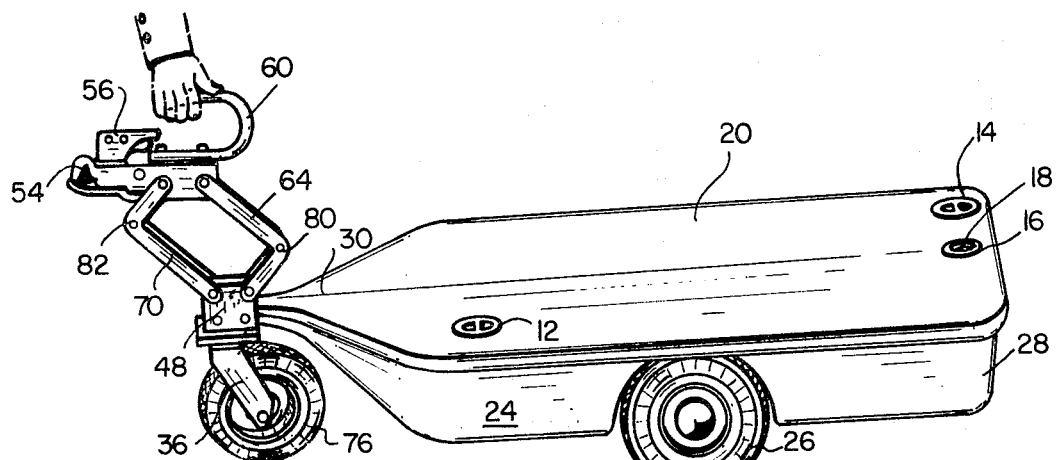
FIG. 2 is a perspective view showing the hitch, raised to its highest vertical elevation for manual handling of the trailer apart from the towing vehicle.

In FIG. 2 the hitch is illustrated in its highest attitude wherein the trailer may be moved readily while wheel 76 pivots from side to side. Manifestly, during towing by a vehicle the hitch may be extended from its lowest FIG. 3 position to its highest FIG. 2 position without affecting the level attitude of the trailer tongue.

Various parallelogram linkages may be employed and the trailer may be modified readily without departing from the spirit of the invention.

We claim:

1. An adjustable trailer hitch of the type used for attachment to a towing vehicle comprising:
   A. a base securable to the forward portion of a trailer;
   B. a wheel depending from said base;
   C. an arm and connecting joint supported forwardly of said base, so as to engage a towing vehicle complemental hitch component;
   D. a parallelogram linkage interconnecting said arm and said base so as to support said arm in parallel with said base, as said arm may be lifted vertically above said base, including;
      i. a pair of top right angle levers having their vertically downwardly extending ends pivoted in the top of said base and their horizontally extending ends pivoted in said arm;
      ii. a pair of bottom right angle levers having their vertically upwardly extending ends pivoted in said arm forwardly of said top right angle lever horizontal ends and their horizontally extending ends pivoted in said base forwardly of said top right angle lever downwardly extending ends.

2. An adjustable trailer hitch of the type used for attachment to a towing vehicle comprising:
   A. a base securable to the forward portion of a trailer;
   B. a wheel depending from said base;
   C. a hitch arm of the type attachable to a towing vehicle supported forwardly of said base;
   D. a parallelogram linkage interconnecting said hitch arm and said base, so as to support said arm in parallel with said base, as said arm may be lifted vertically above said base, including:
      i. a pair of top right angle levers having their vertically downwardly extending ends pivoted in the top of said base and their horizontally extending ends pivoted in said hitch arm;
      ii. a pair of bottom right angle levers having their vertically upwardly extending ends pivoted in said hitch arm forwardly of said top right angle lever horizontal ends and their horizontally extending ends pivoted in said base forwardly of said top right angle downwardly extending ends.

3. An adjustable trailer hitch of the type used for attachment to a towing vehicle as in claim 2, said hitch arm including a ball socket concavity.

4. An adjustable trailer hitch of the type used for attachment to a towing vehivle as in claim 3, said wheel being pivoted laterally in said base.

5. An adjustable trailer hitch of the type used for attachment to a towing vehicle as in claim 4, including a handle extending upwardly from said hitch arm 6. An adjustable trailer hitch of the type used for attachment to a towing vehicle as in claim 5, said pair of top right angle arms and said bottom right angle arms each including interconnecting struts, so as to rigidize the arms with respect to each other.

7. An adjustable trailer hitch of the type used for attachment to a towing vehicle as in claim 6, said base further including:
   i. a flat portion pivotally supporting a downwardly depending and pivoted yoke in which said wheel is mounted;
   ii. laterally spaced vertical sides supporting the pivoted ends of said top and bottom pairs of arms.

8. An adjustable trailer hitch of the type used for attachment to a towing vehicle as in claim 7, said base sides encompassing a trailer tongue extensible into said base.

* * * * *